Figure 3:
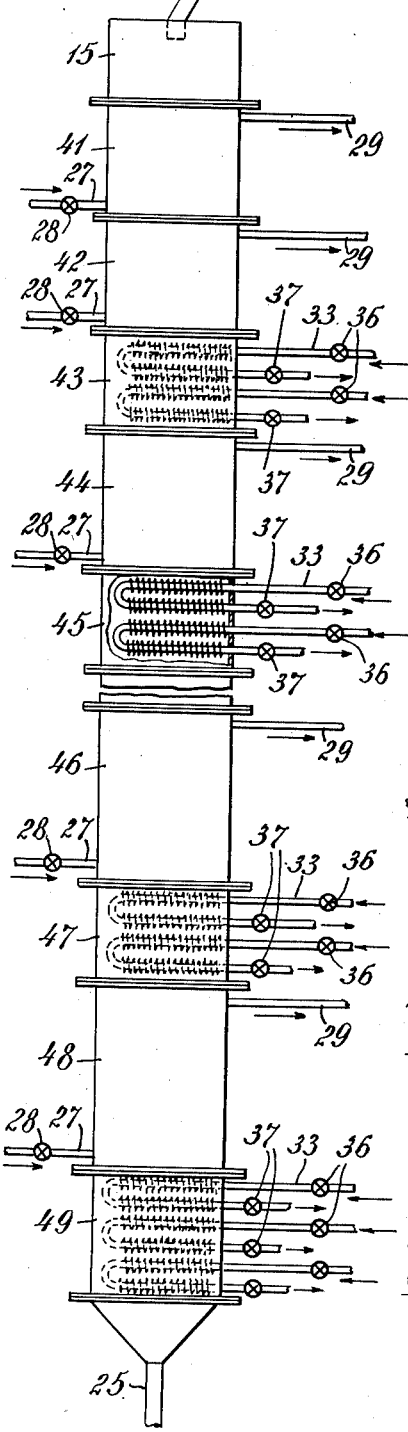

May 13, 1952     T. P. SIMPSON     2,596,299
APPARATUS FOR CONDUCTING THERMOCHEMICAL CONVERSIONS
Original Filed Nov. 30, 1943     2 SHEETS—SHEET 1
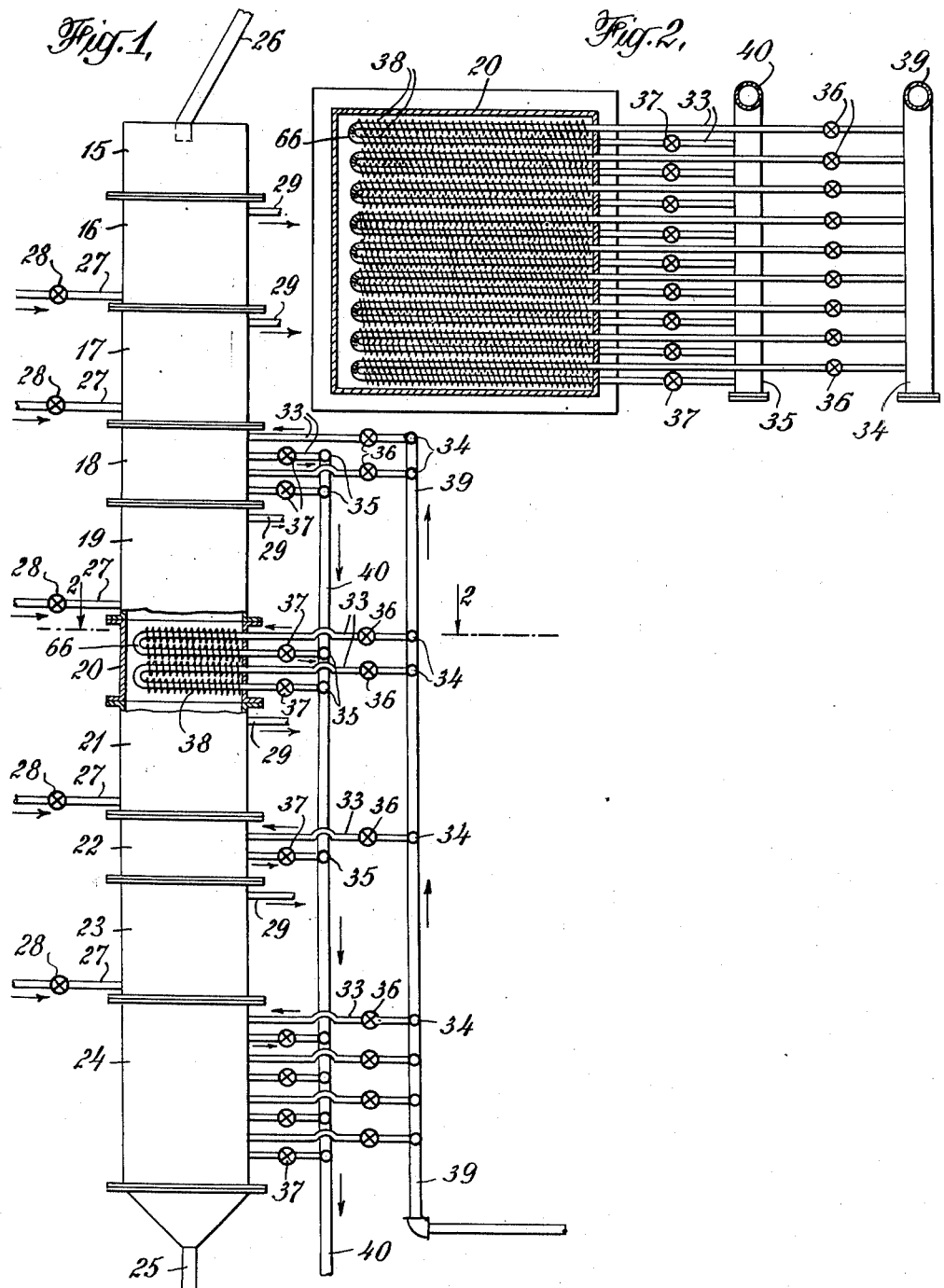
INVENTOR
THOMAS P. SIMPSON
BY
AGENT OR ATTORNEY May 13, 1952  T. P. SIMPSON  2,596,299
APPARATUS FOR CONDUCTING THERMOCHEMICAL CONVERSIONS
Original Filed Nov. 30, 1943  2 SHEETS—SHEET 2

INVENTOR
THOMAS P. SIMPSON
BY
AGENT OR ATTORNEY

Patented May 13, 1952

2,596,299

UNITED STATES PATENT OFFICE 2,596,299

APPARATUS FOR CONDUCTING THERMO-CHEMICAL CONVERSIONS

Thomas P. Simpson, Woodbury, N. J., assignor to Socony-Vacuum Oil Company, Incorporated, a corporation of New York Original application November 30, 1943, Serial No. 512,324. Divided and this application June 23, 1945, Serial No. 601,103

1 Claim. (Cl. 23—288)

This application is a division of my application, Serial Number 512,324, filed in the United States Patent Office, November 30, 1943, now Patent No. 2,458,433, issued February 11, 1947.

This invention has to do with an apparatus adapted for conducting endothermic or exothermic reactions of fluid reactants in the presence of a moving mass of particle form solid contact material which may or may not be catalytic to the desired reaction. Exemplary of the processes of this kind is the regeneration of spent contact materials, previously used as catalysts for the cracking conversion of hydrocarbons, it being well known that hydrocarbons of a gas oil nature boiling between about 500° F. and about 750° F. may be substantially cracked to gasoline, lighter hydrocarbons and limited amounts of heavy tarry materials by passing them at reaction conditions of temperature and pressure such as, for example, temperatures of the order of 825° F. and above at pressures somewhat above atmospheric in contact with a solid adsorptive catalytic contact mass. The heavy tarry products, usually called coke, are deposited upon the particle from contact mass thereby decreasing its activity and must be removed therefrom by some method such as high temperature combustion with air. Usually the particle form contact mass partakes of the nature of fullers' earth or natural or treated filtering clays and/or various synthetic associations of alumina, silica or alumina and silica, any of which may or may not have other constituents added for a purpose in connection with the processes such as certain metallic oxides. In a most recent form this operation has developed as one in which the particle form solid contact mass material is moved cyclically through two zones in the first of which it is subjected to reaction and in the second of which it is subjected to the action of a fluid regenerating medium such as a combustion supporting gas, acting to burn off contaminant materials deposited upon the contact mass during reaction.

This invention has specifically to do with the construction and arrangement of reactor or regenerator vessels wherein reactions are conducted the net thermal result of which is either the liberation or absorption of heat in the presence of a moving particle form contact mass the temperature of which is maintained at desired levels in the various sections of stages of said reactors or regenerators by the supply or removal by an adequate means of the proper amount of heat to or from the various stages. Inasmuch as that part of reactors or regenerators dealing with the removal or supply of heat to the contact material therein involve the same fundamentals of application, construction and operation, the term regenerator will hereinafter in the description of this invention and in claiming this invention be used in a sense sufficiently broad to include reactors or other fluid-solid contact apparatus regardless of exact purpose or use.

In the operation of regenerators of the type above mentioned wherein the contaminant material deposited upon a contact mass is burned from said mass by the action of a combustion supporting gas such as air while said contact mass slowly passes through the regenerator, it is important that the temperature of the contact mass be controlled at or above those levels which will support reasonably rapid combustion of the contaminant material and below those levels which will have a detrimental effect upon the contact material activity by reason of sintering or changing the form or composition of said contact material. The temperature level conducive of active regeneration as described is generally substantially higher than the minimum temperature which will support combustion in the same stage of regeneration, and the optimum temperature for a given burning rate tends to increase as the amount of residual contaminant decreases. Generally in the regeneration of contact materials such as those used for hydrocarbon cracking reactions, the composition and form of the contaminant material changes as the burning thereof progresses, that is, as the contact material passes through the various sections or stages of the regenerator, resulting in the liberation of widely different amounts of heat in various equal-volume stages of the regenerator. Furthermore, since that part of the contaminant to be removed from the contact material in the later stages of the regeneration often burns less readily than the first part of the contaminant removed, it is sometimes desirable to conduct the latter part of the regeneration operation at higher temperature ranges than the early part of the regeneration. If, as has been the practice in the past, a means is provided for the supply or removal of heat at substantially uniform and equal rates from all sections or stages of such a regenerator vessel, the result is the removal of insufficient heat from those stages where the rate of combustion heat liberation is the highest and the removal of too much heat from those stages where the rate of combustion heat liberation is the lowest. As a result the rate of combustion in the overcooled sections is further retarded, thereby greatly decreasing the burning capacity of those stages and often resulting in incomplete removal of the contaminant from the contact material.

A major object of this invention is the provision of an improved apparatus for conducting thermochemical conversions in the presence of a moving particle form solid material which apparatus permits accurate and flexible control of the temperature of the solid material during the progress of the conversion regardless of fluctuations in the rate of heat release or absorption during the progress of said conversion.

A further object of this invention is the provision of an apparatus for regeneration of spent contaminant bearing contact mass materials by burning which apparatus permits flexible control of the regeneration conditions and contact material temperature during the course of the regeneration of said contact material.

Figure 4:
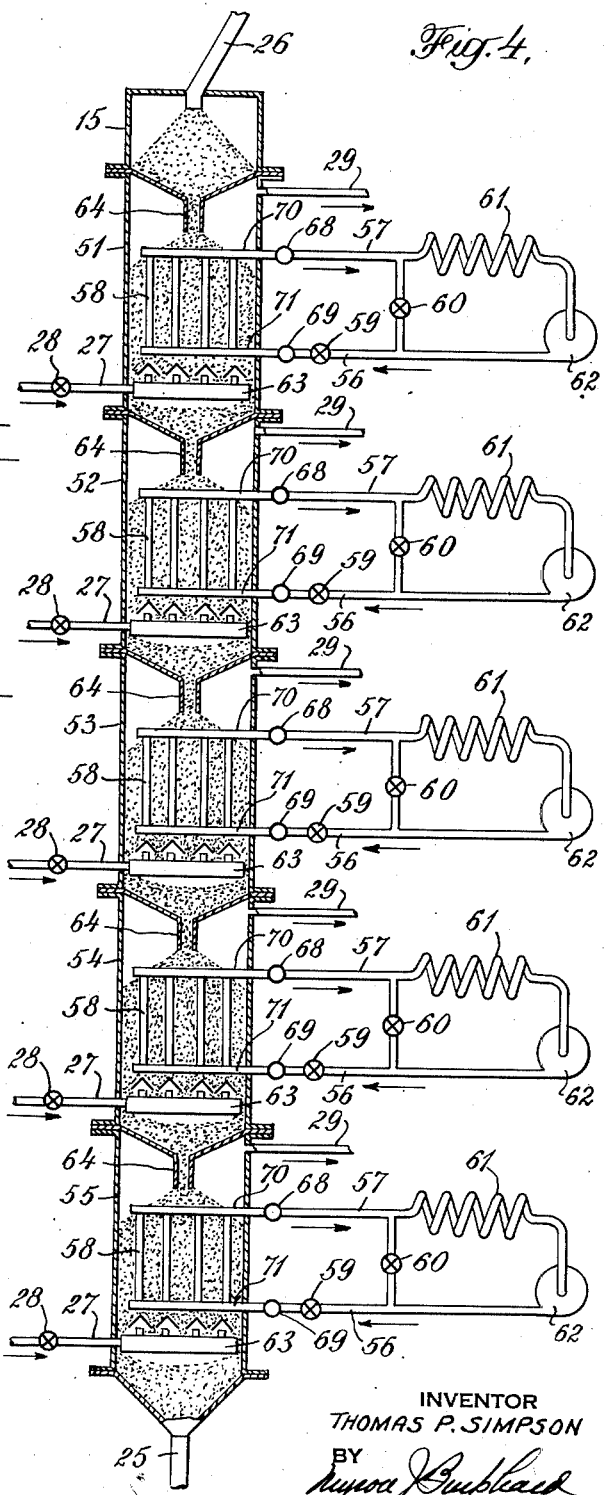

In order to readily understand this invention, reference is made to the drawings attached hereto in which drawings Figure 1 shows an elevation view, partially in section, of a multi-stage regenerator in which are inserted between the superposed burning stages, heat removal sections and coils. Figure 2 is a plan view of this regenerator at one of these heat removal sections and shows the arrangement of the heat transfer tubes therein. Figure 3 shows an elevational view, partially in section, of a multi-stage regenerator in which a modified proportioning arrangement of burning and cooling stages is used to accomplish the proper contact material temperature control. Figure 4 is an elevation view partially in section showing a regenerator composed of a number of burning stages each of which is equipped with independent heat transfer systems. All these drawings are diagrammatic in form.

Turning now to Figure 1, we find a multi-stage regenerator consisting of a number of superposed burning stages 16, 17, 19, 21 and 23 of which 16 is superimposed directly upon 17 and between all the other burning stages are inserted cooling sections. Thus, between burning stages 17 and 19, 19 and 21, and 21 and 23, are cooling sections 18, 20 and 22, respectively. Finally, below the last burning stage 23, is a large cooling section 24. Cooling sections 18 and 20 are identical in construction and each consists of two sets of hair pin shaped coils 33, one set above the other, each of which sets is made up of a number of such hair pin coils uniformly spaced in parallel, side by side, across the entire cross section of the cooling section, the inlet of which coils are connected to the common manifold 34 and the outlet of which coils are connected to the common manifold 35. These inlet and outlet manifolds from each set of coils in each cooling section are in turn connected in parallel to the common inlet and outlet riser pipes 39 and 40 respectively. These riser pipes connect into a single central heat transfer medium circulation and temperature control system, not shown. On the inlet to each coil is a throttle valve 36 and on the outlet of each coil is a pressure relief valve 37, and that part of the coils within the cooling section may be provided, in some cases, with fins 38 which provide additional heat transfer surface. The two sets of hair pin shaped coils thus form four rows of cooling tubes uniformly spaced across the entire cooling section cross section. In cooling section 22 there is only one set of similarly arranged hair pin shaped coils, and in the final cooling section 24 there are four sets of such coils. To each of the burning stages are connected separate air inlet pipes 27 in which are flow control valves 28, and separate flue gas or air outlet pipes 29. Inside the burning stages are adequate air distributing and collecting means, not shown. Contact material is fed to the small surge chamber 15 at the top of the regenerator and is withdrawn from the bottom of the regenerator through pipe 25.

Turning now to Figure 2, we find a sectional plan view looking down on the top row of cooling tubes in a typical cooling section. In this drawing is shown the heat transfer medium inlet manifold 34 to which are connected the inlet end of the cooling coils 33, which extend across the cooling section 20 and make a downward U bend 66 and return across the cooling section and out to a common outlet manifold 35. The heat transfer inlet riser pipe 39 from the heat transfer medium temperature regulating chamber and circulation pump is shown connecting into the inlet manifold 34.

Turning again to Figure 1 for a study of the operation of the regenerator, let it be assumed for the purpose of example, that the regenerator shown in this drawing is to be used for the burning from a contact material of a contaminant previously deposited in a gas oil cracking reaction. Generally such contaminants consist mainly of very high molecular weight hydrocarbon compounds, the hydrogen in which will burn to vapor products, mainly steam, much more rapidly and easily than the carbon. Thus most of the hydrogen and some of the carbon are removed in the early part of the regeneration with the liberation of a considerable amount of heat per weight of contaminant removed, leaving for the next phase of the regeneration a deposit consisting mainly of carbon which burns at corresponding temperatures with considerably less readiness and with considerably less heat liberation per unit weight of contaminant removed. After this there is a final phase of regeneration in which it is frequently found that to secure good removal of carbon and acceptable burning rates, higher mean temperatures of burning, i. e., a higher minimum temperature after any cooling, must be used. At the same time this requirement is frequently coupled with the burning of less carbon per unit volume of regenerator than in the second phase of regeneration. Thus although the burning may be slow in the initial burning stage 16 in which the temperature of the contact material is low, and in which it gradually rises as the material passes through said stage, the burning will be very rapid in the next flow stages and generally considerably more burning will be accomplished and considerably more heat will be released in these early stages than will be accomplished in an equal volume of the later burning stages. In fact, even if equal weights of contaminant are removed in all the stages, still, for the reasons mentioned above, more heat will be liberated per equal volume of early stages than later burning stages. Thus where the burning stages are of equal size as shown in Figure 1, it is necessary to remove heat at gradually decreasing rates after each consecutive burning stage if the temperature level of the contact material is to be maintained within the desired limits in each burning stage.

Thus, in one illustrative example of operation, the spent contact material may be charged to the top of the regenerator in Figure 1 at 800° F. and pass through the surge section 15 into burning section 16 at that temperature. In this section the temperature of the contact material may rise due to the heat liberated by combustion to, say, 925° F. In this particular operation it has been found desirable to control the contact material between 950° F. and 1100° F. in the early and intermediate burning stages, the 950° minimum being high enough to give an acceptably high rate of burning for this particular contact mass and contaminant. (Burning at substantially lower temperatures can be accomplished, but at substantially lower rates.) Consequently, no cooling section is required for this particular operation between burning sections 16 and 17. With other contact materials, or with different degrees of contamination, the temperature attained in the first stage may be different, and cooling between 16 and 17 may be indicated. The heat liberated by burning in section 17 raises the contact material temperature to about 1100° F. at which temperature the material flows to cooling section 18. Here it is cooled to such a temperature level as will not permit it to be reheated above the upper limit of 1100° F. in the next burning zone, which in this instance happens to be about 950° F. Thus, the contact material enters burning section 19 at 950° F. and leaves that section at 1100° F. and is again cooled to about 950° F. in the subsequent cooling section 20. Note that there are roughly equal cooling loads in sections 18 and 20 and consequently equal amounts of cooling surface. The rate of heat liberation due to burning has by this time decreased somewhat so that in the next burning section 21, the temperature of the contact material only reaches about 1075° F. The burning and heat liberation rate will be still lower in the next burning stage, and since the burning rate therein will be higher and the removal of the last part of the contaminant more thorough, with a higher average burning temperature therein within the set maximum limit, the contact material is only cooled to about 1025° F. in cooling section 22, which has only one set of cooling coils. It then enters burning section 23 and the heat liberated there is only sufficient to reheat it to 1100° F., and since in the particular example the contaminant has now been adequately removed, no further burning sections are required. The contact material then enters cooling section 24 in which it must be cooled to about 850° F. which is sufficiently close to the desired reaction vessel inlet temperature; this is a considerably higher cooling load than encountered in any of the other cooling sections and eight rows of cooling tubes are provided in this section. The above data will be understood to be exemplary, since with other catalytic materials and with other types and degrees of contamination, other temperatures will necessarily be used while still following the same principle of operation.

The cooling system used for the regenerator in Figure 1 is one in which a heat transfer medium such as a molten alloy or melted inorganic salt of high boiling point such as nitrates and nitrites of sodium or potassium or certain high boiling point organic compounds in liquid state or hot water under pressures of the order of 100 to 450 pounds per square inch gauge, is circulated through cooling coils connected in parallel to a single large heat transfer medium temperature control and circulation system. Thus, heat transfer medium of approximately the same temperature is charged to every cooling section. Furthermore in this type of system a relatively high rate of heat transfer medium circulation is maintained through the cooling tubes so as to permit better heat transfer coefficients, more uniform heat transfer, and so as to avoid heating the heat transfer medium to excessive temperatures, and any flow rate adjustments are of a minor nature and are not such under the circumstances as will materially affect the rate of cooling by a given coil. Thus, it is characteristic of this type of system that the major control on the amount of heat transfer in the cooling section is through regulation of the amount of cooling surface or tubes used in a given cooling section. Hence in the regenerator shown in Figure 1 the amount of cooling surface in the various cooling sections is varied dependent upon the change in rate of burning and heat liberation in the adjacent burning sections.

Separate systems may be provided for the circulation of the same or different kinds of heat transfer media to the individual cooling systems. Thus, the nature, temperature and rate of circulation of the heat transfer medium could be varied to control the amount of heat transferred in each cooling section. In this case, the cooling surface distribution in the various cooling sections could be somewhat different than that shown in Figure 1. With other variables the same, however, the quantity of heat removed by each cooling section would still be the same as for the regenerator of Figure 1.

Another method of applying this invention is to increase the size or length of each succeeding burning zone so as to compensate for the gradual decrease in burning rate and heat liberation, so that the amount of heat liberated in each burning stage, though of different size, would be approximately the same. Such an arrangement would require the removal of substantially the same amount of heat at all the cooling sections, exclusive, of course, of the ones on the inlet and outlet of the regenerator. It can be seen, however, that although the cooling is done at nearly equal rates in each cooling stage of such an arrangement still the amount of cooling calculated on the volume of each burning section or upon the weight of contaminant removed therein gradually decreases with consecutive stages down the regenerator the same as it did in the previous example. Such a regenerator is shown in Figure 3 in which 41, 42, 44, 46 and 48 are superposed burning stages which increase in length in the order named and progressively down the regenerator. The burning stages have individual air inlet pipes 27 and outlet pipes 29 and adequate internal means of air distribution and collection. Between burning sections 42 and 44, 44 and 46, and 46 and 48 are the identically constructed cooling sections 43, 45 and 47 respectively. At the outlet of the regenerator is the large cooling section 49 which is used to adjust the contact material temperature to that required in the reaction vessel of the cyclic system. In each of cooling sections 43, 45 and 47 are two sets of hairpin type cooling coils 33 which constitute four rows of cooling tubes and which are connected to common manifolds and riser pipes not shown. In some cases it may be desirable to provide the coils within the cooling section with fins 38. The final cooling section 49 is of similar construction and has three sets of cooling coils. Spent contact material is charged to the regenerator through pipe 26 and regenerated contact material is withdrawn from the bottom of the regenerator through pipe 25.

In those regenerators shown above the burning and cooling operations have been conducted in separate independent sections of the regenerator, but this invention is also applicable to multi-stage regenerators in which the cooling and burning operations are conducted in the same chambers. Such a regenerator is shown in Figure 4 in which are shown the superimposed burning stages 51, 52, 53, 54 and 55, the contact material inlet pipe 26 and drain pipe 25.

At the top of each regeneration stage there is provided some suitable construction whereby a vapor disengaging space may be had, through which contact mass material from the zone next above may be introduced, coupled with proper isolation between zones. For clarity in the present diagrammatic drawing, these arrangements are reduced to a conical partition and single contact mass flow pipe, as indicated at 64, between the several stages.

To each stage are connected independent air inlet pipes 27, distributing means 63 and 65 and outlet pipes 29. Each stage is also supplied with heat transfer systems consisting of uniformly distributed cooling tubes 58 in the burning stage, connected to inlet manifolds 69 by means of pipes 71 and to outlet manifolds 68 by means of pipes 70 which inlet and outlet manifolds connect to inlet and outlet circulation pipes 56 and 57, respectively. Each outlet pipe 57 connects into a heat transfer medium cooler 61 which is connected to a circulation pump 62 by which the heat transfer medium is charged to pipe 56. Valves 59 and 60 are also supplied to each piping system to permit control of the flow of heat transfer medium through the cooling tubes 58. In this type regenerator, the rate of heat removal from each stage may be controlled either by regulation of flow of heat transfer medium through the cooling tubes 58, or if the heat transfer medium is not of the type which will permit this, by regulation of the temperature of the heat transfer medium charged to each stage. Thus different types of heat transfer medium, or the same medium, either of which may be maintained between different temperature limits, may be used in the various independent stages.

In all the above described applications of this invention the same fundamentals are involved, namely, the provision in a multi-stage reactor or regenerator vessel, in which reactions are conducted in the presence of a moving mass of particle form contact material with the liberation or absorption of heat, of a means for removing or supplying heat either to or from the various reaction zones of said vessels or to chambers between such reaction zones at a sufficient rate to control the temperature level of the contact material passing therethrough between those limiting temperature ranges desired in each of the reaction stages of said vessel. Inasmuch as the rate of heat removal from or between any given stages of the reactor or regenerator vessel is dependent upon a great number of variables such as the reactants involved and their concentration or partial pressure, the allowable temperature and pressures in the reaction zones, the type and nature of the contact material, the rate of regeneration desired per stage, and the design of the reaction stages, etc., as well as upon the change in rate of reaction and the rate of heat release or absorption as the reaction progresses due to change in the composition of one or more of the reactants, no set dimensions or specifications for this invention can be flatly given. For each installation the rate of heat release or absorption in each stage of the reaction vessel must be determined by experiment or by calculation and then the proper heating and cooling installation for each particular stage of the reactor or regenerator vessel, which will supply or remove sufficient heat to maintain the contact material between the desired temperature ranges may be calculated by conventional methods.

It should be understood that the types of regenerators above shown and/or described and the various methods of applying this invention above shown are merely diagrammatic and exemplary in character and are not meant to limit either the method or means of application of this invention or the vessels or processes to which it may be applied, be the reactions involved in such processes either essentially endothermic or exothermic in net effect.

I claim:

In a system for conducting thermo-chemical conversions in the presence of a substantially compact column of downwardly moving particle form solid material the apparatus combination which comprises: means defining an elongated vessel, means to admit solid material to one end thereof, means to withdraw solid material from the opposite end thereof, a plurality of partitions across said vessel at a plurality of spaced vertical intervals dividing said vessel into a vertical series of chambers, conduit means depending from each of said partitions and terminating within the upper section of the chamber next below for flow of solid between chambers, at least one gas inlet to each chamber near one end and at least one gas outlet near the opposite end of each chamber, within at least each chamber intermediate the uppermost and lowermost chambers a plurality of stationary heat transfer tubes spaced uniformly apart throughout substantially the entire length of each chamber between its gas inlet and gas outlet, a separate external heat exchange fluid inlet manifolding communicating the tubes in each of said chambers, a separate external heat exchange fluid outlet manifolding communicating the tubes in each of said chambers, external manifolding closing the circuit between said inlet and outlet manifolding for each chamber and a heat exchanger and heat exchange fluid pump connected in series in said last named manifolding.

THOMAS P. SIMPSON.

REFERENCES CITED

The following references are of record in the file of this patent:

UNITED STATES PATENTS

| Number | Name | Date |
| --- | --- | --- |
| 1,155,402 | Bornmann | Oct. 5, 1915 |
| 1,905,883 | Barstow et al. | Apr. 25, 1933 |
| 2,226,535 | Payne | Dec. 31, 1940 |
| 2,226,578 | Payne | Dec. 31, 1940 |
| 2,311,984 | Guild | Feb. 23, 1943 |
| 2,409,596 | Simpson et al. | Oct. 15, 1946 |